United States Patent Office 2,831,796
Patented Apr. 22, 1958

2,831,796
PROCESS FOR PREPARING A CHEMICALLY STANDARDIZED PROTOVERATRINE PRODUCT

Harold A. Nash and Robert M. Brooker, Indianapolis, Ind., assignors to Allied Laboratories, Inc., Kansas City, Mo., a corporation of Delaware No Drawing. Application June 4, 1954
Serial No. 434,681

2 Claims. (Cl. 167—67)

This invention relates to a chemically standardized protoveratrine preparation suitable for the control of hypertension. More particularly, it relates to a protoveratrine preparation that has been chemically standardized and adjusted so that it contains pre-selected proportions of protoveratrine A and protoveratrine B.

Still more particularly the present application relates to a process which comprises the steps of subjecting a sample of a lot of protoveratrine to countercurrent distribution treatment using an acidified aqueous-chlorinated solvent system to effect a separation of protoveratrine A and protoveratrine B, determination of the proportions of protoveratrine A and protoveratrine B present in the sample and then adjusting the protoveratrine A and B ratios in the lot to a pre-selected desired concentration by adding thereto a substance selected from the group consisting of protoveratrine A, protoveratrine B, and a mixture of protoveratrines A and B having known ratios of A and B to give a final mixture containing 45% ±5% of protoveratrine B.

Veratrum album has long been known to contain alkaloids that are effective in lowering blood pressure, one of the most important ones being protoveratrine. In spite of this property, alkaloidal preparations from *Veratrum album* have been used to treat high blood pressure only sporadically during the last 70 years. One reason for their sporadic use has been that the range between the dose causing blood pressure fall and the dose causing undesirable side effects, such as vomiting, is a narrow one. Striking this narrow range with the complex mixture of alkaloids as isolated from the plant is very difficult and this is especially true when it is considered that *Veratrum album* roots from various sources and during various seasons of the year vary in their alkaloidal content and proportion of alkaloids. Biological assays conducted on each lot of alkaloids have permitted more accurate dosing, but the results obtained are still quite variable.

Attempts have been made in the past to isolate pure individual alkaloids from *Veratrum album* with the hope that one having a high hypotensive action and uniformity of composition could be found. One of the alkaloidal substances isolated in the past and previously thought to be a pure substance is known as protoveratrine. Protoveratrine isolated and purified by published procedures [Craig and Jacobs, J. Biol. Chem. 143, 427 (1942); Jacobs and Craig, J. Biol. Chem. 149, 271 (1943)] had a melting point of 265–269° C. with decomposition and an optical rotation of $(\alpha)_D^{25}$ of —39.0° in pyridine (c.=1 in pyridine) which have been considered criteria of purity.

In our co-pending application, Serial No. 319,433, filed Nov. 7, 1952, which issued as Patent 2,748,112 on May 29, 1956, we have shown that protoveratrine is in fact a mixture containing varying proportions of two alkaloidal substances. In carrying out that invention, protoveratrine is subjected to a countercurrent distribution treatment which results in the isolation of two new alkaloidal substances which we designate as protoveratrine A and protoveratrine B. There are many ways of carrying out countercurrent distribution processes, and our invention is not limited to any particular technique.

In order to illustrate, the following is a description of a countercurrent distribution process using separatory funnels:

Forty grams of protoveratrine [M. P. 265–269° C. with decomposition, $(\alpha)_C^{25}$=—39° (c.=1 in pyridine)] was introduced into a separatory funnel containing 200 ml. of a 1:1 mixture of ethylene chloride-chloroform and 200 ml. of 2% acetic acid solution. After shaking to effect equilibration, the chloroform-ethylene chloride phase was moved to a second funnel containing 200 ml. of 2% acetic acid. 200 ml. of fresh chloroform-ethylene chloride was moved into funnel No. 1. After shaking to equilibrate, the chloroform-ethylene chloride phase from funnel No. 2 was moved into funnel No. 3 (containing 200 ml. of 2% acetic acid solution), the chloroform-ethylene chloride phase from funnel No. 1 was moved into funnel No. 2; and fresh chloroform-ethylene chloride was moved into funnel No. 1. This process was repeated until the chloroform-ethylene chloride reached funnel No. 15.

At this point examination showed a separation into two alkaloids, one being concentrated in funnels 1 through 5 and the other in funnels 7 through 14. The alkaloids were recovered by drawing off and pooling the appropriate chloroform-ethylene chloride phases and then making the appropriate 2% acetic acid phases alkaline with ammonia and repeatedly extracting with small portions of chloroform, the chloroform being apropriately combined with the previously withdrawn chloroform-ethylene chloride. The combined chloroform and chloroform-ethylene chloride solutions were concentrated to about 80 ml. in each case and 100 ml. of ether added to cause crystallization of the alkaloids.

The alkaloid recovered from funnels 1 through 5 has been named protoveratrine B. It has been found on hydrolysis to yield one mole each of protoverine, 2-methylbutyric acid, 2,3-dihydroxy-2-methylbutyric acid and two moles of acetic acid. It melts at 268–270° C. with decomposition, has $(\alpha)_D^{25}$ of —37.0° (c.=1 in pyridine), and has $(\alpha)_D^{25}$ of —3.5° (c.=1 in chloroform). Protoveratrine B is further identified by the following partial empirical formula indicating the ester groups.

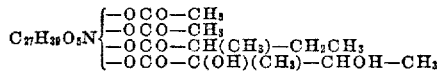

The name protoveratrine A has been adopted for the alkaloid recovered from funnels 7 through 14. It yields one mole each of protoverine, 2-methylbutyric acid, 2-hydroxy-2-methylbutyric acid and two moles of acetic acid on hydrolysis. It melts with decomposition at 267–269° C., has $(\alpha)_D^{25}$ of —40.5° (c=1 in pyridine), and has $(\alpha)_D^{25}$ of —10.5° (c=1 in chloroform). Protoveratrine A is further identified by the following partial empirical formula indicating the ester groups.

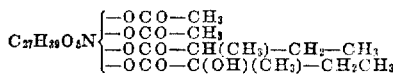

The exact funnels in which the two alkaloids are to be found in a distribution of *n* steps depends in some degree on the starting concentration of alkaloid. This is so because the distribution coefficients of the alkaloids between the two phases vary with concentration of the alkaloids. In a series of distributions in which 20 ml. of aqueous and 20 ml. of organic solvent phase were used in each funnel and a total of 2 gm. of alkaloids was used, chloroform-2% aqueous acetic acid solution was a preferred solvent combination.

In our patent application, Serial Number 319,433, filed on November 7, 1952, and as described above, we have shown that the alkaloid protoveratrine is made up of two separate chemical entities, protoveratrine A and protoveratrine B. The present application is a continuation-in-part of our application, Serial Number 319,433, and relates to a process of preparing a chemically standardized protoveratrine product containing definite pre-selected proportions of protoveratrine A and protoveratrine B.

In general, the method of carrying out our invention comprises subjecting protoveratrine containing unknown proportions of protoveratrines A and B to a countercurrent distribution treatment to effect a separation of each of the alkaloids, protoveratrine A and protoveratrine B and then measuring the amount of each separated alkaloid. The quantities can be determined gravimetrically by evaporation of the solvent from the separate fractions containing protoveratrines A and B respectively. Preferably, the quantities of the separated A and B are determined by a color producing reaction. When the concentrations of protoveratrines A and B thus determined do not fall within the desired range, the concentrations are adjusted by the addition of protoveratrine A, protoveratrine B, or protoveratrine containing known ratios of A and B so as to give a final mixture containing the desired concentrations of each protoveratrines A and B. A more detailed description of the method of carrying out our invention is illustrated by the following.

A satisfactory solvent system is prepared by equilibrating water, chloroform and acetic acid (49.5:49.5:1 by volume). Using 20 ml. of the aqueous phase and 20 ml. of the chloroform phase at each step, a 14 step Craig countercurrent distribution is carried out (the funnels are numbered 0–14). A one gram sample of the unassayed protoveratrine is introduced into funnel 0 at the first step. The chloroform phase is moved. After funnel 14 is reached, 0.2 ml. samples are withdrawn from each phase from each funnel. The samples are separately evaporated to dryness in vacuo, and 5 ml. of concentrated sulfuric acid is added to each dried sample, resulting in a color producing reaction. At the same time 5 ml. portions of sulfuric acid are added to four 0.5 mg. samples of the lot of protoveratrine being examined. After sixteen hours at room temperature, the optical density of all the sulfuric acid solutions is measured at 4920 A. The amounts in milligrams of protoveratrine in each phase of each funnel is calculated as follows:

$$\frac{\text{Optical density of unknown} \times 20 \times 0.5}{\text{Average optical density of reference solns.} \times 0.2}$$

The distribution curve should show two peaks, one in funnel No. 2 and the other in funnels Nos. 10 or 11. The total weight of alkaloid in funnels 0–5 is taken as protoveratrine B and the total weight of alkaloid in funnels 6–14 is taken as protoveratrine A. For the results to be acceptable, the total apparent recovery, adding the amount found in all funnels by the colorimetric assay, must be 100±5% of the weight of protoveratrine actually used in the distribution series.

The protoveratrine A to B ratio is then adjusted to one containing 45±5% protoveratrine B by mixing with another lot of protoveratrine having known proportions of protoveratrine A and B and/or pure protoveratrine A or B.

Our invention is more fully illustrated by the following specific examples.

*Example 1*

Using the countercurrent distribution-colorimetric assay technique described above, protoveratrine lot 205595 assayed 57.6% protoveratrine B. To bring the protoveratrine B content within the desired range (40–50% B), 1364 gm. of this lot was mixed with 965 gm. of lot 54325 which assayed 25.0% protoveratrine B.

The expected assay of the mixture was 44.1% B; 44.49% B was found by actual assay by our countercurrent distribution-colorimetric technique.

*Example 2*

Using the countercurrent distribution-colorimetric assay technique described above, protoveratrine lot 204900 assayed 34.4% protoveratrine B. To bring the protoveratrine B content within the desired range (40–50% B), this lot was mixed with 73 gm. of pure protoveratrine B.

The expected assay of the mixture was 43.4% protoveratrine B; 41.7% protoveratrine B was found by actual assay by our countercurrent distribution-colorimetric technique.

It is seen that our invention makes it possible to assay chemically protoveratrine, which contains a mixture of indefinite proportions of protoveratrines A and B, depending on each particular batch of root, and which mixture in the past has been considered a single alkaloidal substance.

The importance of having a chemical assay procedure available is readily apparent from the following data showing the variation of the protoveratrine A and B content of protoveratrine from different batches of crude drug.

| Lot No: | [1] Percent protoveratrine B |
|---|---|
| D | 58.6 |
| F | 36.2 |
| G | 47.3 |
| H | 46.0 |
| PV X 113 | 44.5 |
| PV X 116 | 54.6 |
| PV X 117 | 51.2 |
| 204900 | 34.4 |
| 54095 | 57.6 |
| 205195 | 29.4 |
| 53784 | 54.2 |
| 53787 | 22.4 |
| 53335 | 47.7 |
| 205448 | 61.8 |
| 205536 | 20.6 |
| 205595 | 57.6 |
| 54325 | 25.0 |
| 54285 | 44.0 |
| 54917 | 45.5 |

[1] Remaining percent protoveratrine A.

Since these new alkaloids differ in their physiological characteristics, it is desirable that chemically standardized alkaloids be made available for the treatment of hypotensive patients. As previously indicated, the range between the hypotensive dose and the dose producing undesirable side effects, such as vomiting, is narrow in the case of *Veratrum album* alkaloidal mixture. It is a distinct advantage of our invention, therefore, that protoveratrine of the prior art, varying in the proportion of desirable alkaloidal components, can now be chemically assayed and adjusted to contain any desired pre-selected proportions of the pure alkaloid protoveratrine A and the pure alkaloid protoveratrine B. In addition to the solvent substances employed in our specific example, ethylene chloride-2% acetic acid has also been used and found satisfactory. Likewise, various acids or buffer substances can be used to acidify the aqueous phase. When chloroform is used in the 2% acetic acid, the upper limit of acidity is probably about pH 4.0. When ethylene chloride is employed, somewhat higher pH values may be employed. With the proper adjustment of the pH values of the aqueous phase, various other solvents such as methylene chloride, methyl-chloroform, and other chlorinated solvents can be substituted for chloroform and ethylene chloride.

In the foregoing illustration of our invention, we have employed protoveratrine isolated from *Veratrum album*.

It should be understood, however, that our invention is applicable to protoveratrine regardless of its source, and our invention applies to protoveratrine isolated from any Veratrum species.

We claim:

1. A process of preparing a chemically standardized protoveratrine product containing pre-selected proportions of protoveratrine A represented by the following partial empirical formula indicating the ester groups:

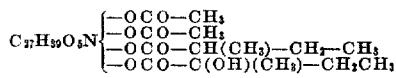

having a melting point of about 267–269° C. with decomposition, $(\alpha)_D^{25}$ of —40.5° in pyridine, $(\alpha)_D^{25}$ of —10.5° in chloroform, and which on hydrolysis yields one mole each of protoverine, 2-methylbutyric acid, 2-hydroxy-2-methylbutyric acid and two moles of acetic acid and protoveratrine B represented by the following partial empirical formula indicating the ester groups:

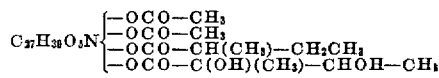

having a melting point of about 268–270° C. with decomposition, $(\alpha)_D^{25}$ of —37.0° in pyridine, $(\alpha)_D^{25}$ of —3.5° in chloroform, and which on hydrolysis yields one mole each of protoverine, 2-methylbutyric acid, 2,3-dihydroxy-2-methylbutyric acid and two moles of acetic acid, which comprises the steps of subjecting a sample of a lot of protoveratrine containing unknown proportions of protoveratrine A and protoveratrine B to a countercurrent distribution treatment employing a solvent system of aqueous acetic acid and chloroform to effect a separation of protoveratrine A and protoveratrine B, adding sulfuric acid to each of the separated alkaloidal portions allowing a color to develop, and then measuring colorimetrically the amount of each the protoveratrine A and protoveratrine B in the sample which represents the proportions of each in the lot, and finally adding to the lot of protoveratrine a calculated quantity of a substance selected from the group consisting of protoveratrine A, protoveratrine B, and a mixture of protoveratrines A and B having known ratios of A and B, to give a final mixture containing pre-selected proportions of protoveratrines A and B.

2. A process of preparing a chemically standardized protoveratrine product containing 45±5% protoveratrine B, which comprises the steps of subjecting a sample of a lot of protoveratrine containing unknown proportions of protoveratrine A and protoveratrine B to a countercurrent distribution treatment employing a solvent system of aqueous acetic acid and chloroform to effect a separation of protoveratrine A and protoveratrine B, adding sulfuric acid to each of the separated alkaloidal portions and then measuring colorimetrically the amount of each the protoveratrine A and protoveratrine B in the sample which represents the proportions of each in the lot, and finally adding to the lot of protoveratrine a calculated quantity of a substance selected from the group consisting of protoveratrine A, protoveratrine B, and a mixture of protoveratrines A and B having known ratios of A and B, to give a final mixture containing 45±5% protoveratrine B represented by the following partial empirical formula indicating the ester groups:

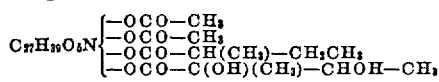

having a melting point of about 268–270° C. with decomposition, $(\alpha)_D^{25}$ of —37.0° in pyridine, $(\alpha)_D^{25}$ of —3.5° in chloroform, and which on hydrolysis yields one mole each of protoverine, 2-methylbutyric acid, 2,3-dihydroxy-2-methylbutyric acid and two moles of acetic acid and the remaining percentage of alkaloid comprising protoveratrine A represented by the following partial empirical formula indicating the ester groups:

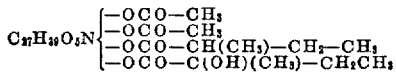

having a melting point of about 267–269° C. with decomposition, $(\alpha)_D^{25}$ of —40.5° in pyridine, $(\alpha)_D^{25}$ of —10.5° in chloroform, and which on hydrolysis yields one mole each of protoverine, 2-methylbutyric acid, 2-hydroxy-2-methylbutyric acid and two moles of acetic acid.

References Cited in the file of this patent

UNITED STATES PATENTS 2,374,407  Block _____ Apr. 24, 1945

FOREIGN PATENTS 683,083  Great Britain _____ Nov. 19, 1952